United States Patent [19]
Mastrangelo et al.

[11] 3,950,460
[45] Apr. 13, 1976

[54] PROCESS FOR MAKING RIGID, ELECTRICALLY CONDUCTIVE, CELLULAR STRUCTURES

[75] Inventors: Sebastian Vito Rocco Mastrangelo, Hockessin; Jerry Allen Nelson, Newark, both of Del.

[73] Assignee: E. I. Du Pont de Nemours and Company, Wilmington, Del.

[22] Filed: Oct. 26, 1973

[21] Appl. No.: 411,491

Related U.S. Application Data

[63] Continuation-in-part of Ser. No. 216,805, Jan. 10, 1972, abandoned.

[52] U.S. Cl. .................. 264/44; 106/41; 252/518; 252/520; 260/429.5; 264/104; 264/317; 264/DIG. 44; 75/20 F
[51] Int. Cl.² ........................................ B27D 27/00
[58] Field of Search .............. 264/44, 317, DIG. 44; 106/41; 252/507, 508, 518, 520; 260/429.5

[56] References Cited
UNITED STATES PATENTS

| 2,966,505 | 12/1960 | Lane | 260/429.5 |
|---|---|---|---|
| 3,093,513 | 6/1963 | McCallum et al. | 136/100 |
| 3,111,396 | 11/1963 | Ball | 264/44 |
| 3,536,480 | 10/1970 | Winkler | 264/44 |
| 3,547,833 | 12/1970 | Yano et al. | 252/463 |
| 3,682,839 | 8/1972 | Galloway | 252/508 |

FOREIGN PATENTS OR APPLICATIONS

| 923,862 | 4/1963 | United Kingdom | 264/44 |
|---|---|---|---|
| 1,313,174 | 4/1973 | United Kingdom | 264/44 |

*Primary Examiner*—Allan Lieberman
*Attorney, Agent, or Firm*—James A. Costello

[57] ABSTRACT

Disclosed herein is a method for making an electrically conductive rigid cellular structure which comprises (i) coating the exposed surface of a porous, heat or solvent-removable substrate with a mixture of aluminum powder and titanate ester, (ii) decomposing the titanate ester of the mixture to effect cohesive binding of the coating, (iii) removing the substrate, and (iv) heating the remaining structure to develop electrical conductivity.

24 Claims, No Drawings

PROCESS FOR MAKING RIGID, ELECTRICALLY CONDUCTIVE, CELLULAR STRUCTURES

CROSS-REFERENCE TO RELATED APPLICATION

This application is a continuation-in-part application of U.S. application Ser. No. 216,805, filed on Jan. 10, 1972, now abandoned.

BACKGROUND OF THE INVENTION

1. Field of the Invention

This invention relates to a method for making a rigid cellular structure by coating and firing a composition comprising aluminum powder and organic titanate ester on a porous, sacrificial substrate. The structure prepared by the method of this invention are useful as catalytic supports which can be electrically heated, or as flow-through type electrical heating elements which afford rapid heat transfer to liquids and gases flowing therethrough.

2. Description of the Prior Art

U.S. Pat. No. 3,111,396 discloses a method for making a low density, porous, inherently electrically conductive metal or metal compound foam, which method comprises (a) impregnating a porous organic structure with powdered material in a fluid, (b) slowly drying the impregnated organic structure, (c) heating the impregnated organic structure slowly to decompose the organic structure and fluid to a weakly bonded carbon structure while closely retaining the shape and size of the original organic structure, and (d) sintering the impregnated carbon-powdered material at high temperature to further join the powder in a continuous form.

A typical impregnating slurry of U.S. Pat. No. 3,111,396 is made of a liquid such as an organic solvent or water, a metal, metal oxide, or other metal compound in powder form, and usually a decomposable binder. In one embodiment, a powdered nickel base alloy is oxidized to form an oxide of the alloy which is then slurried with binder and water. Active heating steps of the method, when carried out in a reducing atmosphere of hydrogen, result in a brittle or ductile foam of the original unoxidized alloy depending on the chemical reactivity of the binder used.

In contrast to the teaching of U.S. Pat. No. 3,111,396, the present invention provides a rapid method for producing an electrically conductive, rigid cellular structure having high compressive strengths of, preferably, at least 50 psi, without the need for slow carbonization to achieve bond strength of an intermediate structure during processing, without the need for prolonged sintering at high temperatures, and without the need for oxidation and subsequent reduction in an atmosphere of hydrogen. Concerning the successively higher heating steps taught in U.S. Pat. No. 3,111,396, the reference teaching is summarized in column 2, at lines 27 to 43. Further, the organic substrate structures of the instant invention are removable and are removed in the process disclosed herein. The process of U.S. Pat. No. 3,111,396, on the other hand, teaches the slow carbonization of the substrate to leave a cohesive residue as a support for the metallic component.

SUMMARY OF THE INVENTION

This invention is directed to a method for making an electrically conductive rigid cellular structure which comprises (i) coating the exposed surface of a porous, heat or solvent-removable substrate with a mixture of aluminum powder and titanate ester, (ii) decomposing the titanate ester of the mixture to effect cohesive binding of the coating, (iii) removing the substrate, and (iv) heating the remaining structure to develop electrical conductivity.

To improve the properties, e.g. compressive strength, of the final structures, it is a feature of this process that there can be an additional recoating, a coating applied to the first coating, before the final heating in step iv.

DETAILS OF THE INVENTION

A rigid cellular structure is produced in accordance with the method of the present invention by coating a nonconductive porous substrate with a mixture of aluminum powder and organic titanate ester, making the mixture cohesive, removing or sacrificing the substrate with heat or a suitable solvent, and then heating to react the cohesive mixture and render it electrically conductive.

The heat or solvent-removable sacrificial substrate employed is normally a synthetic or natural organic material in porous form, e.g., a sponge, netting, honeycomb or foam which presents a 3-dimensional network with interconnecting voids. If desired, particulate substrates that can be loosely packed to form a network with interconnecting voids, e.g., organic or inorganic beads, balls, fibers, or simply powder piled in a container can be employed in the process of this invention. While numerous commercially available porous materials such as cellulose sponge, integrally extruded polyethylene and polypropylene netting, or paper honeycomb can be used in the practice of this invention, open-celled polyurethane foam formed in a 3-dimensional network with interconnecting voids is preferred. This open-celled polyurethane foam is available commercially in a large variety of pore sizes ranging from about 5 to 100 p.p.i. (pores per linear inch). Representative polyester and polyether polyurethane foams containing from about 5 to 45 p.p.i. are preferable for the production of a rigid cellular structure useful as a highly permeable, flow-through heating element.

Useful open-celled polyurethane foam materials are prepared by reacting a polyisocyanate, such as toluene diisocyanate with a polyester or polyether containing hydroxyl groups. A typical polyester used is the reaction product of adipic acid and ethylene glycol, while polyethylene ether glycol is an example of an appropriate polyether. Water is normally employed as a foaming agent as it reacts with isocyanates to release carbon dioxide. Additional foaming can be obtained by the addition of low-boiling chlorofluorocarbons.

Open-celled polyurethane foams can be thermally reticulated by explosive flame propagation to form a 3-dimensional network of interconnected strands of polyurethane resin as described in U.S. Pat. No. 3,353,994. These reticulated polyurethane foams are most preferred. Chemical etching with hydroxide solution can then be used to dissolve residual thin walls separating the cells, according to U.S. Pat. No. 3,171,820 to form highly reticulated industrial foams having about 97% void space. The use of such a foam as a substrate in the present invention is most preferred and results in rigid cellular structures which are distinguished by their very low bulk densities ranging from about 5 to 20 lb. per cubic foot. The substrate itself has a bulk density of about 1.5 to 2.5 lb./ft.$^3$, but its weight does not contribute to the bulk density of the final product because it is removed during the method of this invention. The rigid cellular structure formed tends to have essentially the same reticulated structure as the original substrate used. When a suitable substrate has been selected or prepared, it is coated with an aluminum powder and titanate ester mixture.

The coating mixture normally comprises
1. aluminum powder,
2. organic titanates ranging from very reactive simple esters and polymeric forms of esters to stabilized chelated forms, these include
   a. alkyl ortho esters of titanium having the general formula $Ti(OR)_4$, wherein R is $C_{1-18}$ alkyl,
   b. polymeric alkyl titanates obtainable by condensation of the alkyl ortho esters of (a), i.e., partially hydrolyzed alkyl ortho esters of the general formula $RO[-Ti(OR)_2O-]_{x-1}R$, wherein R is as above and x is a positive integer,
   c. titanium chelates, derived from ortho titanic acid and polyfunctional alcohols containing one or more additional hydroxyl, keto, carboxyl or amino groups capable of donating electrons to titanium. These chelates have the general formula

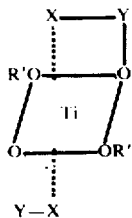

wherein R' is H, R as above or X–Y, wherein X is an electron donating group such as oxygen or nitrogen and Y is an aliphatic radical having a two or three carbon atom chain such as
   i. $-CH_2CH_2-$, e.g., of ethanolamine, diethanolamine and triethanolamine,

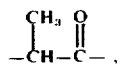

ii. e.g., of lactic acid,

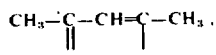

iii. e.g. of acetylacetone enol form, and

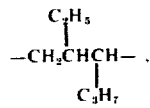

iv. e.g., as in 1,3-octyleneglycol,
   d. titanium acylates having the general formula $Ti(OCOR)_{4-n}(OR)_n$, wherein R is $C_{1-18}$ alkyl as above and n is an integer of from 0 to 3, and polymeric forms thereof,
   e. mixtures thereof,
which, i.e., (a) through (e) are capable of forming cohesive titanium oxide films when heated at temperatures in a range from about 200°C. to 450°C. and when necessary
3. sufficient inert organic solvent, as thinner, to allow the mixture to penetrate into a porous substrate which presents a 3-dimensional network with interconnecting voids, thereby at least coating the substrate.

Organic titanate compounds other than those set out above can be employed as carriers for titanium provided they form cohesive polymeric titanium oxide films by being heated to 200° to 450°C. or by being hydrolyzed with water or water vapor.

In selecting the aluminum component material for the mixture, a fine type—325 mesh designation aluminum powder is preferred for its ability to remain in suspension in the coating or impregnating mixture although coarser types up to 100-mesh designation or higher can be used. Leafing grades are most preferred.

Representative alkyl ortho esters of organic titanate include tetrabutyl titanate (TBT), tetraisopropyl titanate (TPT), tetrakis(2-ethylhexyl)titanate (TOT), and tetrastearyl titanate (TST).

Representative polymeric alkyl titanates include partially polymerized butyl titanate (PB) which exhibits a structure believed commercially to resemble $RO[-Ti(OR)_2O-]_nR$ wherein R is $C_4H_9$ and n is approximately 8. Other polymeric alkyl titanates partially hydrolyzed to a greater or lesser extent than the commercially available product PB may be derived from butyl alcohol or from alcohols in wider use such as isopropyl, ethyl or methyl alcohol. Other polymeric titanates may be formulated which decompose at moderate temperatures to effect cohesive binding.

Representative titanium chelates include titanium acetylacetonate wherein two acetylacetonate groups and two propoxy groups are bonded to titanium. This is available commercially as "Tyzor" Organic Titanate AA. Another useful chelate is titanium lactate wherein two lactate groups and two hydroxy groups are bonded to titanium. This is available as "Tyzor" LA. Another is triethanolamine titanate wherein two $C_3H_7$-O groups and two $(HOCH_2CH_2)_2 NCH_2CH_2O-$ groups are bonded to titanium, available as "Tyzor" TE. Still another is tetraoctylene glycol titanate wherein four

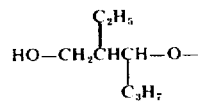

groups are bonded to titanium, available as "Tyzor" OG.

Representative titanium acylates and polymeric forms thereof include titanium tetraacylates of the general formula $Ti(OCOR)_4$ where R is $C_{1-18}$ alkyl, thereby forming (OCOR) acyl groups which contain up to 18 carbon atoms such as acetyl, propionyl, butyryl or stearoyl groups. Also included are polytitanyl diacylates of the general formula

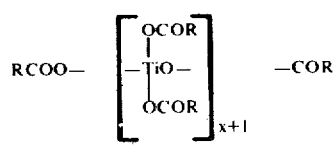

wherein R is the same as above and $x$ is a positive integer, and also hydroxy or alkoxy polytitanyl acylates containing repeating units

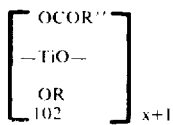

where OR is hydroxy or $C_{1-18}$ alkoxy, $x$ is a positive integer, and OCOR" is a $C_{1-18}$ acylate group. A representative hydroxy polytitanyl acylate is obtainable by the polymerization reaction in acetic acid of tetraisopropyl titanate with stearic acid such that R" is $CH_3(CH_2)_{16}$ and R is H.

Preferably a polymeric alkyl titanate that is sensitive to water upon contact, i.e., capable of rapid hydrolysis, is used in the coating mixture. It can be used also in combination with one or more of the nonpolymeric organic titanates described above for economic reasons. For example, polymerized butyl titanate (PB), sometimes referred to generically as poly(dibutyl)titanate, is preferably used in combination with alkyl ortho esters of titanium such that it contributes 20 mole percent of the titanium metal of the combination, and still the cellular structure produced by the method of the invention is more rigid than a corresponding product produced with the alkyl ortho ester alone.

It is sometimes necessary to employ a thinner in conjunction with the titanate ester, e.g. polymeric organic titanate PB tends to be too viscous (approx. 3200 cps at 25°C.) to readily penetrate and coat most porous substrates, and is therefore preferably thinned with an inert organic solvent having a boiling point below about 200°C., e.g. "Decalin" (decahydronaphthalene, b.p. 194.6°C.) and n-heptane (b.p. 98.4°C.) as well as other volatile hydrocarbon solvents. When PB is used in combination with other organic titanates that are generally less viscous, the amount of solvent thinner can be reduced in proportion to the mole percent of PB present. Most organic titanates are viscous liquids that require a thinner. A few are solids such as tetrastearyl titanate (TST), and therefore require the use of a solvent such as benzene or carbon tetrachloride. If the substrate to which the coating is applied is to be removed by pyrolysis, it should not be swollen or dissolved by the solvent used as a thinner.

If it is necessary to utilize a thinner with the titanate, two conditions must be satisified in selecting the type and amount of thinner to go in the coating mixture. (1) The titanate with thinner should be sufficiently viscous to prevent excessive drainage from the porous substrate after the coating mixture is applied thereto. (2) The viscosity of the titanate with thinner should not be so great as to restrict penetration of the mixture into the pores. A suitable viscosity range for the titanate or titanates with thinner is from about 1 to 20 cps before combining with the aluminum powder. The thickness of the coating deposited on the pore walls of a sponge or on the interconnecting strands of the preferred reticulated foam will vary with the viscosity of the coating as well as with its composition.

In preparing the coating mixture, the atom ratio of aluminum to aluminum plus titanium should be between 0.81 and 0.96. Values above or below this range produce cellular structures that are very weak, sometimes so weak that they collapse from their own weight. Even better strength is obtained when the atom ratio is between 0.87 and 0.94.

In addition to aluminum powder, titanate ester and possibly a thinner solvent, fillers can be added to the coating mixture for special purposes. If the porous structure being manufactured is intended as a catalyst support, the mixture can include a precious metal catalyst or a precursor thereof, for example, a halide salt of platinum such as hexachlorodihydrogen platinum (IV), i.e., $H_2PtCl_6$. Heat treatment in carrying out the method of this invention is normally sufficient to effect decomposition of such a precursor to the precious metal itself. Catalytic activity is then restored or readily enhanced by subsequent exposure of the precious metal dispersed in the rigid cellular structure to an activating agent such as aqueous hydrazine or direct exposure to activating hydrogen gas.

Alternatively, catalysts can be deposited on the pore surfaces of a rigid cellular structure after it is prepared by the method of this invention. Any of the well-known catalytic oxides such as chromium oxide, nickel oxide, copper oxide or vanadium pentoxide, which are useful as hydrocarbon oxidation catalysts for engine exhaust gas catalytic afterburners, is applicable as an aqueous slurry and then heated to evaporate the water. Platinum can be added similarly by contacting pore surface with a platinum chloride solution, the liquid then being evaporated by the application of heat.

The coating mixture is normally prepared by simple mixing at ambient temperature under conditions such that extensive hydrolysis of the organic titanate does not make the mixture too viscous to enter the porous substrate. Some organic titanates that are water insoluble and stable present no difficulty; however, others subject to hydrolysis are usually thinned to a suitable viscosity and combined with the aluminum powder while avoiding prolonged contact with ambient water vapor. It is normally sufficient to prevent extensive titanate hydrolysis if the mixture preparation is done quickly in air at ambient pressure and the container holding the mixture is capped. A blanket of dry inert gas such as nitrogen or argon can also be used to prevent contact with ambient water vapor. Once the mixture is prepared, it is vigorously agitated before coating a substrate in order to put the aluminum particles into suspension.

Coating consists essentially of three steps:
1. contacting the porous substrate with the coating composition, thereby at least coating the substrate,
2. removing excess coating composition which tends to fill the pores, and
3. drying to remove any thinner solvent present. If no thinner is utilized, Step (3) may be eliminated.

During the first of these steps, extensive hydrolysis of the titanate is still avoided, preferably by working in a dry atmosphere of argon or nitrogen, but controlled hydrolysis later during the drying step either at room temperature or a slightly elevated temperature below decomposition temperature seems to be beneficial and is preferred because it promotes adhesion of the mixture to the porous substrate. While hydrolysis during drying, by exposure to atmospheric moisture, produces high molecular weight condensation products believed to contribute to the cohesive binding of the coating mixture developed upon decomposition of the titanate ester and ultimately to the rigidity of the final cellular structure, such hydrolysis is not essential because drying can be carried out in a vacuum oven or under nitrogen with satisfactory results.

Step (i)

Coating the porous substrate with the coating mixture consists of dipping or immersing the substrate into the mixture or pouring the mixture over the substrate. Other means of coating the porous substrate can be readily determined by those acquainted with coating technology. When the substrate is sufficiently flexible, it is alternately squeezed and allowed to expand while it is immersed to insure saturation of all pores with the mixture. When the substrate is relatively inflexible, it is dipped more than once in the mixture and allowed to drain to remove excess mixture that tends to block or fill pores.

Excess mixture blocking the pores of a flexible foam, such as the cells of the preferred reticulated polyurethane foam, is removed by squeezing the foam gently and uniformly, then opening remaining blocked pores with a stream of gas such as argon or compressed air. When the substrate is relatively inflexible, removal of the excess mixture is accomplished by use of the gas stream. Typically this results in a structure very open in one direction, i.e., the direction of the impinging stream of gas, but partially blinded in directions perpendicular thereto. This blinding, which is optically visible, produces an anisotropic distribution of the mixture which can enhance the compressive strength in a blinded direction and can establish a preferred current path that presents a desired electrical resistance in the final product.

Drying and removal of the thinner solvent usually can be accomplished (a) at room temperature by selecting a relatively volatile thinner, or (b) by heating to a moderate temperature, normally below the boiling point of the solvent used. It is desirable that the substrate, when dry, be stiff enough to the touch to be picked up and moved to a furnace, although the primary concern is that the coating be complete and relatively uniform, i.e., free of unwanted variations in deposited mixture due to gravity or handling.

Step (ii)

After the substrate is coated, decomposition of the organic titanate ester is undertaken. Decomposition of the organic titanate ester is carried out by hydrolysis, pyrolysis or a combination of these methods. The temperature at which the titanate ester decomposes depends on the structure of the particular ester but is normally between 200°C. and 450°C. The end products of this step are sometimes difficult to identify but are generally titanium oxides, i.e., finely divided titanium dioxide which can be highly reactive with powdered aluminum in the final heating step of the present invention and, of greater importance, polymeric titanium oxides or hydrous titanium oxides which provide the cohesive binding of the coating on the porous substrate necessary to form a self-supporting structure so that when the underlying substrate is removed, the original porous structure form is retained.

Hydrolysis of the titanate ester, to develop cohesive binding, i.e., "stiffness to the touch" can be combined with the drying step to remove thinner solvent. A proper choice of organic titanate ester makes this possible, e.g., alkyl ortho esters of titanium hydrolyze rapidly upon exposure to water or water vapor at ambient temperature. A preferred procedure involves hydrolyzing the ester of the coating mixture in situ in an atmosphere having a relative humidity of from about 10 percent to the condensation point of water vapor, to avoid the formation of water droplets on the coating. When, for example, coated on a suitable substrate and set in the air at normal room humidity, i.e., about 30% R.H., sufficient cohesive binding of the coating often develops overnight. Dependent on substrate size and porosity, however, cohesive binding can increase further if the coated substrate is allowed to sit over a period of several days. Such hydrolysis is even more preferred when carried out at a temperature of from about 200°C. to 450°C. To speed hydrolysis, the coated substrate is preferably first dried free of solvent and then placed "over water" in a closed container, i.e., exposed to an open water surface, or, even more preferably, hydrolyzed in contact with water vapor at an elevated temperature. Titanium chelates generally hydrolyze much more slowly the alkyl ortho esters and titanium acylates tend to be even more stable in the presence of water. They are normally decomposed by heating up to about 350°C. to develop cohesive binding.

Thermal decomposition of the titanate ester takes place satisfactorily in air at a temperature of from about 200°C. to 450°C. in an ordinary muffle furnace, but a non-oxidizing atmosphere is preferred such as nitrogen gas. In one embodiment, the coated substrate is heated while being purged continuously with nitrogen gas in an air-tight furnace in order to maintain it in an atmosphere enriched with nitrogen and remove volatile decomposition products of both the substrate and the titanate ester. Heating in a completely closed system without purging tends to retain decomposition products which may ultimately result in variations of the appearance, compressive strength and electrical conductivity of the cellular product, but the product is still useful.

Step (iii)

After the titanate ester has decomposed and the coating has developed sufficient cohesion to become a self-supporting structure, the substrate can be removed easily by any suitable means readily determined by one skilled in the art, e.g., by a suitable heating step that "ashes out" or causes the substrate to decompose to gases or volatile liquids which escape from the cellular structure. Both heat and reduced pressure are usually required for effective sublimation. In some cases, the substrate can be chosen so that it sublimes away from the coating mixture. Some substrates can more easily be removed as liquids by melting them or even by extracting them by contacting them with a suitable solvent. An example would be extraction of polystyrene with an aromatic hydrocarbon such as toluene. Low bulk density of the final product is achieved by a combination of (1) substrate removal by a suitable means as discussed above and (2) the tendency of the product to have essentially the same reticulated structure as the original substrate.

Decomposition by the heating ("ashing-out") of the underlying porous substrate must occur at a higher temperature than decomposition of the organic titanate ester in order to preserve structural integrity, i.e., to keep the structure from collapsing. This can be readily insured by hydrolyzing or polymerizing the coating mixture sufficiently to develop cohesion before the substrate decomposes. Polymeric alkyl titanates tend to develop this cohesion readily and are thus preferred. In general, however, the substrate should decompose after the organic titanate, i.e., at a temperature normally above about 200°C. but below about 650°C., otherwise the porous structure will collapse. Most organic titanates decompose sufficiently, in less than an hour at 350°C. to effect cohesive binding of the coating mixture, while the preferred highly reticulated polyurethane foam substrate requires a comparable time at about 450°C. to decompose.

Most organic titanates hydrolyze to some extent while the carrier solvent is being evaporated in humid atmosphere and thus gain strength which contributes to the cohesive binding developed by decomposition. When a titanate, like the chelate tetraoctylene glycol titanate (OG), resists hydrolysis, it is preferred to use it in conjunction with a substrate that ashes out at a higher temperature than does polyurethane foam, e.g., cellulose sponge or polyimide foam. This allows for more extensive decomposition of the organic titanate at a temperature higher than about 450°C. to form cohesive polymeric titanium oxides, without decomposition of the substrate occurring.

Step (iv)

After the substrate has been effectively removed by ashing-out or extracting with a solvent, the temperature of the remaining structure is raised to at least 650°C. to effect or insure satisfactory compressive strength and electrical conductivity of the final structure. By stating that the temperature of the structure is raised to at least 650°C. is meant that either the structure is heated to a temperature of at least 650°C. or, as may occur in some instances, that the structure is heated to a temperature below 650°C. at which temperature an exothermic reaction occurs within the structure which raises the temperature of the structure to at least 650°C., i.e., when temperature of the furnace containing the coated cellular structure is raised to within the range of about 600° to 700°C. there frequently occurs an exothermic reaction. The degree of exothermicity depends to a considerable extent on the atmosphere in the furnace. The exothermicity is greatest in air, white hot temperatures sometimes being observed; it is less in nitrogen-enriched atmosphere, particularly in pure nitrogen, and is least in a vacuum or in argon. The exact cause of this exothermic reaction is not completely understood, however, the reaction does raise the structure temperature to a degree high enough, i.e., at least 650°C., to insure the desired conductivity and compressive strength of the final structure.

In all cases where the temperature has exceeded 650°C. the resultant final structure has been observed to have the desired compressive strength, i.e., at least 5 psi and electrical conductivity, i.e., resistivity less than 20 ohm-cm. These desired properties have been observed when the atom ratio of aluminum to aluminum plus titanium utilized in the coating mixture is from 0.81 to 0.96. This ratio is reflected in the final cellular structure.

Caution should be exercised to insure complete ashing-out of the substrate before any ensuing exothermic reaction takes place. This should be done to prevent the cracking or blowing apart of the structure which might otherwise occur.

Compressive yield strength of the final cellular structure is tested by a modified ASTM method using a Dillon dynamometer. A 2-inch diameter core is cut from about a 1-inch thick rigid cellular structure prepared according to the method of this invention. Particular care is taken to make the alternate or opposite faces of the structure, which are to be compressed, flat and parallel. Test pieces prepared in this manner show only a single large break in stress-strain characteristics as a single fragmentation occurs rather than several smaller, premature breaks which can normally be expected if the faces are not flat and parallel. The test piece is subjected to a compressive load which is smoothly increased. Values of compressive yield strength are expressed in pounds of force applied at the break point per square inch of surface, calculated on the basis of the 2-inch diameter.

Compressive yield strengths (compressive strengths) of at least 5 psi are normally obtained. Values of from 50 to over 100 psi are commonly reached using preferred components in the coating mixture and the preferred reticulated foam substrate. Compressive strength appears to increase linearly with the bulk density of the final cellular structure as determined by its weight and external dimensions.

A further increase in bulk density can be achieved, if desired, by taking the cellular structure before or after heating to develop electrical conductivity and recoating it in a second coating step with the coating mixture disclosed previously. This structure, with the newly applied coating, is then heated to a temperature of at least 650°C. whereby it acquires an increased compressive strength sometimes reaching a value of over 200 psi.

A preferred method of increasing bulk density with corresponding increase in compressive strength, is to provide only a quantity of heat sufficient to decompose the titanate ester and pyrolyze the substrate without causing an exothermic reaction to occur. Temperatures of 400° to 500°C. are usually suitable for this purpose. The resulting rigid material so obtained is then coated with the coating mixture disclosed previously herein, in a second coating step, and heated until an exothermic reaction occurs at which time the material becomes conductive.

Flow resistance to gases, utilizing cellular structures prepared by the method of this invention, is tested by inserting test pieces, of the same size used in determining compressive strength, in a steel tube. Flow rates of up to 50 standard cubic feet per minute are then measured on one of two Brooks flowmeters. The pressure drop across a single or several combined test pieces is measured using a water or mercury filled manometer. Measurement of pressure drop at varying flow velocities is sufficient to characterize laminar and turbulent flow components respectively proportional to velocity and velocity squared, thereby establishing that rigid cellular structures of this invention, prepared by using the preferred reticulated polyurethane foam as a substrate, show largely turbulent character.

The electrical conductivity or its inverse, electrical resistivity, of the cellular structure is determined by measuring the electrical resistance of a standard shape of the cellular structure, for example, by cutting a U-shaped piece from the rigid cellular structure; placing each leg of the U in a pool of mercury and then connecting leads from a sensitive Wheatstone bridge to each pool to measure the total resistance. If the resistance of the leads represents a significant correction because of the low resistivity of the test piece, a Kelvin bridge can be employed instead of a Wheatstone bridge. For Ti/Al atom ratios of 3/13 to 1/20, which are within the range of this invention, the calculated electrical resistivity of cellular structures prepared using the preferred polyurethane foam normally ranges from about 0.3 ohm-cm to 0.01 ohm-cm and structures prepared according to the method of this invention but using other than the preferred foam substrate, manifest resistivity of less than 20 ohm-cm. A different geometry, selection of a particular substrate, or an insulating filler for the composition can be used to adjust the resistance to a desired value.

The rigid cellular structures made by the process of this invention comprise an intimate mixture of an intermetallic compound of aluminum titanium, particularly $Al_3Ti$, excess aluminum and, normally, $Al_2O_3$, in an amount commensurate with the amount of oxygen present in the starting materials.

The structures prepared by the process of this invention are useful for such things as catalytic supports that can be electrically-heated; heat transfer surfaces for efficient heating of flowing liquids and gases in turbulent flow; crushable automobile bumper materials; particulate traps and the like. Structures having an electrical conductivity of from 0.3 to 0.01 ohm-cm and a compressive strength of at least 50 psi are preferred.

EXAMPLES

The following Examples are intended to illustrate the invention and not to limit the invention. Unless otherwise indicated, all quantities are by weight.

EXAMPLE 1

In a suitable container, 317 grams of polymeric butyl titanate (16.8% titanium content by weight) diluted with 186 ml of n-heptane was added to 200 grams of aluminum powder (99.0% minimum through 325-mesh). Exposure of the titanate to the atmosphere was minimized by working quickly and capping the container in order to avoid excessive hydrolysis of the organic titanate by ambient water vapor. The mixture in the capped container was vigorously agitated by a magnetic stirring bar to put the aluminum into suspension prior to use.

A porouos substrate suitable for coating was prepared as follows. A 1-inch thick and 3-inch wide strip of thermally reticulated, ester-type polyurethane foam having 15 pores per linear inch, was chemically etched with hydroxide according to the preferred method of U.S. Pat. No. 3,171,820. This increased the degree of reticulation therein to about 97% void space.

The foam thus prepared was then placed in a dry atmosphere of argon gas where it was immersed in a tray containing the mixture prepared above for coating. While immersed, the foam was alternately squeezed and allowed to expand until it became saturated with the coating mixture. After being lifted out of the tray, the saturated foam was squeezed between two cylindrical rolls (1.5-inches in diameter) spaced 0.25 inch apart to remove excess mixture. Blocked cells, still filled with excess mixture, were then opened by transferring the foam strip into ambient surroundings and there passing it once between impinging air jets from two opposing nozzles (6.6 standard cubic feet per minute of air flow through two tubes, each with 31 holes arranged in a single row, ⅛-inch apart and 1/32-inch apart in diameter). The coated foam strip was then set aside to dry in ambient surroundings until solvent evaporation and hydrolysis by atmospheric moisture stiffened it to the touch.

Firing of the dried foam, to decompose the organic titanate, was begun at a temperature of 350° C. in a relatively tight furnace which had been purged with nitrogen. After 30 minutes, the foam was subjected to an increase in temperature to 450° C. to ash-out the reticulated substrate. After an additional 30 minutes, the heat setting of the furnace was increased to 700° C. and within the first minute after reaching the heated impregnated foam was observed to become white hot momentarily. Then, on cooling to furnace temperature, it was observed that the previously glossy light gray color of the dried coated foam had changed to a duller, darker gray color which was retained upon removal from the furnace and on cooling to room temperature.

The compressive strength of the rigid cellular structure obtained above was determined by cutting a 2-inch diameter core from the 1-inch thick strip using a hole saw, care being exercised to keep alternate, opposite, faces flat and parallel. The test sample showed a single large break, i.e., deviation from a linear stress-strain characteristic, after a smooth rise in force applied by a Dillon dynamometer. Values of compressive yield strength in pounds of force applied per square inch of surface of one of the above-mentioned alternate faces (psi), and values of bulk density in pounds of weight per cubic foot (lb./ft.$^3$) were obtained and are shown in Table 1.

Six additional rigid cellular structures were prepared as above but with varying amounts of coating mixture components, as shown in Table 1, to vary the atom ratios of titanium to aluminum and aluminum to aluminum plus titanium as indicated. Table 1 shows the bulk density and compressive yield strength values of the seven rigid cellular structures. A distinct maximum in compressive yield strength was observed at a Ti/Al ratio of 3/26.

TABLE 1

EFFECT OF ATOM RATIO OF MAJOR COMPONENTS IN COATING MIXTURE

| Atom Ratio | | Weight (grams) | | Volume (ml) | Bulk Density | Compressive Yield Strength |
|---|---|---|---|---|---|---|
| Ti/Al | Al/(Al plus Ti) | Aluminum Powder | Organic Titanate PB | n-Heptane | Lbs./ft.$^3$ | (psi) |
| 3/20 | 0.87 | 200 | 317 | 186 | 9.8 | 40 |
| 3/22 | 0.88 | 225 | 324 | 236 | 9.6 | 51 |
| 3/24 | 0.89 | 225 | 297 | 247 | 9.3 | 71 |
| 3/26 | 0.90 | 200 | 244 | 230 | 9.0 | 98 |
| 3/36 | 0.92 | 231 | 204 | 314 | 8.1 | 65 |
| 3/48 | 0.94 | 212 | 140 | 286 | 7.5 | 51 |
| 3/60 | 0.95 | 200 | 106 | 275 | 10.8 | 29 |

EXAMPLE 2

A strip of integrally extruded polyethylene netting (Du Pont "Vexar" Plastic Netting) having 0.025-inch filament diameter and ⅛-inch mesh size was dipped twice into a coating mixture of the following proportions: 1.22 grams of polymeric butyl titanate (Du Pont "Tyzor" PB, 16.8% titanium)/1.0 ml of n-heptane/1.0 gram of aluminum powder (Alcan MD-5100). The coated strip was air dried for several hours and then dried for about 15 hours at 100°C. in flowing trogen. A rigid cellular structure was obtained by heating the coated strip to effect decomposition and exothermic reaction in a nitrogen atmosphere using the same heating temperatures and heating times set forth in Example 1.

EXAMPLE 3

147.1 Grams of polymeric butyl titanate (Du Pont "Tyzor" PB, 16.8% titanium) thinned with 60 ml of toluene was added to 60 grams of aluminum powder (Alcan MD-5100 leafing grade as used in Example 1). A section of paper honeycomb was immersed in the coating mixture, removed and allowed to drain off excess mixture. The wet honeycomb section was dried for about 15 hours at 100° C. in a vacuum oven and was then placed in a muffle furnace at room temperature and heated to 700° C. in 45 minutes. The resultant honeycomb structure was rigid and found, upon testing with an ohmmeter, to be electrically conductive.

EXAMPLE 4

Six coating mixtures were prepared containing tetraisopropyl titanate (Du Pont "Tyzor" Organic Titanate TPT) substituted on the basis of atoms of titanium by 0, 20, 40, 60, 80 and 100% polymeric butyl titanate (Du Pont "Tyzor" PB) respectively. Titanium/aluminum atom ratio was maintained at 3/26. Rigid cellular structures were prepared from polyurethane foam substrate by heating as in Example 1 and coated with the mixture prepared herein. Table 2 shows that the cellular structures prepared according to this Example exhibited useful values of compressive yield strengths. The relative values show improved strength was obtained by the replacement of the simple ortho alkyl ester with the polymeric titanate.

EXAMPLE 5

465.3 Grams of chelate titanium acetyl acetonate (Du Pont "Tyzor" Organic Titanate AA, 9.9% titanium content by weight) was added directly to 225 grams of aluminum powder (Alcan MD-5100) to form a coating mixture. A rigid metallic cellular structure was prepared from a polyurethane foam substrate coated with this mixture by heating as in Example 1.

EXAMPLE 6

A rigid cellular structure was prepared according to the procedure of Example 1 (0.90 atom ratio of aluminum to aluminum plus titanium) except that 10.4 grams of the precious metal catalyst precursor, hexachlorodihydrogen platinum (IV), $H_2PtCl_6$, was included in the coating mixture. The product was active as a catalyst toward oxidation of natural gas at temperatures below redness. The catalyst support prepared in this example can be electrically heated.

EXAMPLE 7 (Comparative)

A mixture of 34.2 grams of titanium dioxide powder (Baker and Adamson reagent grade, 275-mesh), 193 ml of n-heptane and 100 grams of aluminum powder (Alcan MD-5100) was prepared. A second mixture was prepared which contained 10 grams of cellulose acetate butyrate dissolved in 235 ml of acetone as a source of a binder for the titanium dioxide and aluminum particles instead of the arbitrary quantity of n-heptane above. The Ti/Al atom ratios of both mixtures were about 3/26.

The mixtures were employed in a tray as in Example 1 to coat polyurethane foam, but on heating to about 700° C. in a nitrogen atmosphere no exothermic reaction occurred until the furnace door was opened and air was admitted, where upon a vigorous reaction occurred. Both resultant structures were too fragile for compression testing. The binder sample collapsed during the firing procedure. This example shows that when an inorganic titanate, even with the assistance of a binder, was utilized to prepare cellular structures, the resulting structure was not self-supporting and lacked necessary strength to be useful.

EXAMPLE 8

Polystyrene beads (⅛-inch diameter) were coated with a mixture of 50 grams Alcan MD-5100 aluminum powder, 61 grams poly(dibutyl)titanate ("Tyzor" PB, 16.8% Ti), and 63 ml Stoddard solvent. Two grams of the beads were blended with 2 ml of the coating mixture. The coated beads were packed into a 1-inch diameter paper extraction thimble forming a unit, and allowed to sit in air overnight and then over water for 4 days in a closed container. The unit was immersed in toluene for one day after which inspection of the cells near the surface revealed that the beads had been dissolved out, leaving a rigid structure. After drying in air for one day, the unit was heated in an $N_2$ atmosphere at 350° C. for ½ hour, 450° C. for 1 hour and then to 700° C. at which temperature an exothermic reaction oc-

TABLE 2

| Atom % Titanium | | Weight (grams) | | | | | |
|---|---|---|---|---|---|---|---|
| | | Aluminum | Organic Titanate | | Volume (ml) | Bulk Density | Compressive Yield |
| TPT | PB | Powder | TPT | PB | n-Heptane | Lbs./ft.³ | Strength (psi) |
| 100 | 0 | 200 | 244 | 0 | 160 | 7.8 | 31 |
| 80 | 20 | 200 | 195 | 48.7 | 165 | 8.55 | 77 |
| 60 | 40 | 200 | 146 | 97.4 | 198 | 9.4 | 71 |
| 40 | 60 | 200 | 97.4 | 146 | 198 | 9.75 | 92 |
| 20 | 80 | 200 | 49.7 | 199 | 213 | 9.95 | 101 |
| 0 | 100 | 200 | 0 | 244 | 230 | 9.0 | 98 |

EFFECT OF SUBSTITUTED POLYMERIC TITANATE FOR ORTHO ALKYL ESTER curred. On cutting the unit open, it was found that there were small holes in the walls of the "foam" structure. This Example shows (a) the use of a particulate substrate which can be packed so as to form a network of interconnecting voids and (b) the extraction of a substrate with a suitable solvent.

number of samples were carried through different heating steps, cooled to room temperature, and characterized according to bulk density, compressive yield, and electrical conductivity to yield the following illustrative Table 3.

TABLE 3

| Temperature | Firing Time | Condition | Bulk Density (lbs/ft³) | Compressive Yield (psi) | Electrical* Resistance (ohms) |
|---|---|---|---|---|---|
| ambient | none | unfired; coated and dried foam | 10.4 | 97 | 10⁶ |
| 450°C | 30 min | self-supporting; decomposed titanate and decomposed foam | 8.8 | 70 | 10⁶ |
| a. 450°C then b. 625°C | 30 min 10 min | darker gray color and shinier than 2 | 8.2 | 57 | 100 |
| a. 450°C b. 750°C | 30 min 10 min | no exotherm observed during firing at 750°C | 8.2 | 47 | <0.1 |
| a. 450°C b. 715°C | 30 min until a vigorous exotherm was observed | Dull, medium gray color | 8.3 | 76 | <0.1 |

*Point contact resistance between two probes placed about 15/16-inch apart on the surface of the cellular structure.

EXAMPLE 9

A coating mixture was prepared which contained 325 grams of aluminum powder (Alcan MD-7100 extra fine leafing grade, 99.9% minimum through 325-mesh), 351 grams of polymeric butyl titanate (Du Pont "Tyzor" PB, 16.8% titanium content by weight) and 270 ml of n-heptane (0.90 atom ratio of aluminum to aluminum plus titanium). Three pieces of thermally reticulated industrial polyurethane foam, 3 inches × 12 inches × 1 inch, were prepared as in Example 1 taking care to chemically etch in 10% caustic until the bulk density of the original foam was reduced by about 10%. Each prepared foam piece was in turn immersed in the prepared coating mixture, then removed therefrom and squeezed between two 4-inch diameter metal rollers about 3/16-inch apart to remove excess mixture. The rollers were wiped clean, and 1 minute after the first pass between the rollers, each piece was again passed between the rollers breaking the films formed by excess coating mixture which covered some of the pores. Coating was carried out rapidly in ambient surroundings and the three pieces were then laid out flat on a steel screen to dry until stiff to the touch in preparation for firings on the next and following days.

A muffle furnace was placed in a steel housing that could be evacuated and means were provided for introducing nitrogen gas directly into the furnace chamber volume of 0.076 cubic feet, allowing the gas to escape into the surrounding 3.9 cubic feet of steel housing, and exhausting through a port in the housing.

Portions of the pieces of coated foam 2½ inches × 3 inches × 1 inch were individually placed in the furnace chamber sandwiched between two pieces of stainless steel wire mesh. The doors to the furnace and the surrounding steel housing were closed and evacuation effected by pumping down to about 1 Torr pressure. Nitrogen flow was then established at 14–15 S.C.F. per hour before heating. By this procedure, a sufficient This Table shows that compressive strength is evident after coating and drying and is largely retained through the final heating to at least 650° C., the primary result of which is reduction in electrical resistance or increase in conductivity.

For use as a heat transfer surface for efficient heating of flowing gases in turbulent flow, one could for example attach the test piece after substrate decomposition to a 115 volt AC source by means of the point contact probes to form a 132-watt heater for a stream of gas, e.g., plain air or a preheater for the stream of nitrogen mentioned earlier in this Example.

EXAMPLE 10

If another portion of the pieces of coated foam of Example 9 is placed in a furnace chamber, heated in flowing nitrogen at 450° C. for 30 minutes to decompose the titanate and the foam, followed by recoating with the coating mixture of Example 9, removing the excess coating mixture, drying the coating and heating the recoated, self-supporting structure in nitrogen until an exotherm is observed, then in that case the resultant structure will have about double the bulk density and about half the electrical resistivity of the once-coated and fired product of Example 9. (The compressive strength of the recoated structure will exceed 200 psi.)

The embodiment of the invention in which an exclusive property or privilege is claimed are defined as follows:

1. A method for making an electrically conductive rigid, self-supporting, cellular structure which comprises (i) coating the surface of a porous, heat or solvent-removable substrate with a coating mixture of aluminum powder up to about 100-mesh in size and at least one liquid titanate ester that forms cohesive polymeric titanium oxide films by being heated to 200° to 450° C or by being hydrolyzed with water or water vapor, the atom ratio of aluminum to aluminum plus titanium being from 0.81 to 0.96, and removing excess coating mixture, (ii) decomposing the titanate ester of the coating mixture by hydrolysis, pyrolysis or a combination thereof, at a temperature of up to 450° C, to form titanium oxide and to effect cohesive binding of the coating, said temperature being below the decomposition temperature of the substrate, (iii) removing the substrate by heating to a temperature higher than that of step (ii) but below 650° C, or by contacting the substrate with a solvent, and (iv) heating the remaining structure to at least 650° C thereby forming an intimate mixture of aluminum and an intermetallic compound of aluminum and titanium, and developing electrical conductivity.

2. A method according to claim 1 wherein the coating step comprises additionally drying, after removing excess mixture.

3. A method according to claim 1 wherein the titanate ester is decomposed by hydrolyzing the ester in situ in an atmosphere having a relative humidity of from about 10 percent to the condensation point of water vapor.

4. A method according to claim 3 wherein the titanate ester is decomposed by hydrolyzing the ester at a temperature of from about 200° to 450° C.

5. A method according to claim 1 wherein the substrate is removed by heating the substrate to a temperature above 200° C but below 650° C.

6. A method according to claim 1 wherein the removable substrate is an open-celled polyurethane foam.

7. A method according to claim 6 wherein the polyurethane foam is reticulated.

8. A method according to claim 1 wherein (i) comprises coating the surface of a porous, heat or solvent-removable substrate with a mixture of aluminum powder and a titanate ester selected from the group consisting of:
   a. an alkyl ortho ester of titanium having the formula Ti(OR)$_4$, wherein R is C$_{1-18}$ alkyl,
   b. a partially hydrolyzed alkyl ortho ester of the general formula RO[-Ti(OR)$_2$O-]$_{x+1}$R, wherein R is C$_{1-18}$ alkyl and x is a positive integer,
   c. A titanium chelate, having the formula

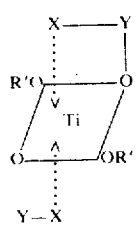

wherein R' is H, C$_{1-18}$ alkyl or X-Y, wherein X is an electron donating group and Y is an aliphatic radical having two or three carbon atom chain
   d. a titanium acylate having the formula Ti(OCOR)$_{4-n}$(OR)$_n$ wherein R is C$_{1-18}$ alkyl and n is an integer of from 0 to 3,
   e. polymeric forms of (d), and
   f. mixtures thereof, wherein each of (a) through (f) is capable of forming cohesive titanium oxide films when heated at temperatures in a range from about 200° to 450° C.

9. A method according to claim 8 wherein R' of the titanium chelate of (c) is X-Y, wherein X is oxygen or nitrogen and Y is an aliphatic radical having a two or three carbon atom chain.

10. A method according to claim 8 wherein R' of the titanium chelate of (c) is X-Y, wherein X is an electron donating group and Y is an aliphatic radical having a two or three carbon atom chain, said chain being selected from the group consisting of:
   i. -CH$_2$CH$_2$-, ii. 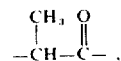

iii. 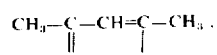

and iv. 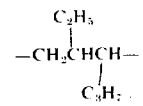

11. A method according to claim 8 wherein the alkyl ortho ester of (a) is selected from the group consisting of tetrabutyl titanate, tetraisopropyl titanate, tetrakis(2-ethylhexyl)titanate, and tetrastearyl titanate.

12. A method according to claim 8 wherein the partially hydrolyzed alkyl ortho ester of (b) is partially polymerized butyl titanate.

13. A method according to claim 8 wherein the titanium chelate of (c) is selected from the group consisting of
   i. titanium acetylacetonate wherein two acetylacetonate groups and two propoxy groups are bonded to titanium,
   ii. titanium lactate wherein two lactate groups and two hydroxy groups are bonded to titanium,
   iii. triethanolamine titanate wherein two C$_3$H$_7$-O- groups and two (HOCH$_2$CH$_2$)$_2$NCH$_2$CH$_2$O- groups are bonded to titanium, and
   iv. tetraoctylene glycol titanate wherein four

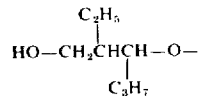

groups are bonded to titanium.

14. A method according to claim 8 wherein the titanium acylate of (d) is a titanium tetraacylate having the general formula Ti(OCOR)$_4$ wherein R is C$_{1-18}$ alkyl.

15. A method according to claim 8 wherein the polymeric titanium acylate of (e) is selected from
   i. polytitanyl diacylates of the general formula

wherein R is C$_{1-18}$ alkyl and x is a positive integer, and
   ii. hydroxy or alkoxy polytitanyl acylates containing repeating units

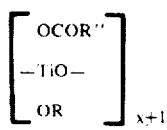

where OR is hydroxy or $C_{1-18}$ alkoxy, x is a positive integer, and OCOR'' is a $C_{1-18}$ acylate group.

16. A method according to claim 1 wherein the atom ratio of aluminum to aluminum plus titanium in the coating mixture is from 0.87 to 0.94.

17. A method according to claim 6 wherein the atom ratio of aluminum to aluminum plus titanium in the coating mixture is from 0.81 to 0.96.

18. A method according to claim 17 wherein the atom ratio of aluminum to aluminum plus titanium in the coating mixture is from 0.87 to 0.94.

19. A method according to claim 12 wherein the atom ratio of aluminum to aluminum plus titanium in the coating mixture is from 0.81 to 0.96.

20. A method according to claim 19 wherein the atom ratio of aluminum to aluminum plus titanium in the coating mixture is from 0.87 to 0.94.

21. A method according to claim 1 wherein the aluminum powder of (i) is a fine type 325-mesh aluminum powder.

22. A method according to claim 14 wherein the aluminum powder of (i) is a fine type 325-mesh aluminum powder.

23. A method according to claim 1 wherein the structure is heated to develop electrical conductivity according to (iv) in a nitrogen enriched atmosphere.

24. A method according to claim 1 comprising, additionally, recoating the structure after step (iii) and before step (iv).

* * * * *